United States Patent [19]

Suman et al.

[11] Patent Number: 5,161,422
[45] Date of Patent: Nov. 10, 1992

[54] UNIVERSAL CONTROL FOR ELECTRICALLY CONTROLLED VEHICLE TRANSMISSION

[75] Inventors: Michael J. Suman; David A. Muyres, both of Holland, Mich.

[73] Assignee: Prince Corporation, Holland, Mich.

[21] Appl. No.: 855,234

[22] Filed: Mar. 23, 1992

Related U.S. Application Data

[63] Continuation of Ser. No. 729,046, Jul. 12, 1991.

[51] Int. Cl.⁵ .............................................. B60K 41/18
[52] U.S. Cl. ...................................... 74/335; 180/315; 180/321; 340/456; 364/424.1; 307/10.1
[58] Field of Search ............................ 74/335, 483 PB; 180/315, 321, 326, 336; 340/456; 364/424.1; 307/10.1, 10.4

[56] References Cited

U.S. PATENT DOCUMENTS

| | | | |
|---|---|---|---|
| 3,326,315 | 6/1967 | Richards | 180/77 |
| 3,590,199 | 6/1971 | Maier | 200/168 A |
| 3,766,793 | 10/1973 | Knop | 74/335 |
| 4,203,375 | 5/1980 | Miller | 74/335 |
| 4,286,131 | 8/1981 | Kopish et al. | 200/340 |
| 4,485,282 | 11/1984 | Lee | 200/51 R |
| 4,685,729 | 8/1987 | Heesch et al. | 297/193 |
| 4,699,239 | 10/1987 | Ishino et al. | 180/315 |
| 4,712,640 | 12/1987 | Leigh-Monstevens et al. | 180/336 |
| 4,790,204 | 12/1988 | Tury et al. | 74/483 PB |
| 4,817,471 | 4/1989 | Tury | 74/866 |
| 4,841,793 | 6/1989 | Leigh-Monstevens et al. | 180/336 |
| 4,884,057 | 11/1989 | Leorat | 340/456 |
| 4,922,769 | 5/1990 | Tury | 74/866 |

Primary Examiner—Leslie A. Braun
Assistant Examiner—William G. Trousdell
Attorney, Agent, or Firm—Price, Heneveld, Cooper, DeWitt & Litton

[57] ABSTRACT

An electrical transmission control employs in one embodiment, a rotary dial switch as a gear selector control which includes a plug means for connecting the switch directly into a receiving socket mounted to the vehicle. In a preferred embodiment, the vehicle includes a plurality of sockets such that the gear selector control can be mounted at a preferred one of the locations. In another embodiment, the selector switch is a slide type switch. The switch can be removed from the socket and/or vehicle for providing anti-theft security preventing the transmission from being shifted without the gear selected control.

24 Claims, 4 Drawing Sheets

UNIVERSAL CONTROL FOR ELECTRICALLY CONTROLLED VEHICLE TRANSMISSION

This is a continuation of application Ser. No. 07/729,046, filed Jul. 12, 1991.

BACKGROUND OF THE INVENTION

The present invention pertains to a control system for the transmission of a vehicle and particularly an electrical control for such purpose.

Vehicle gear shifts typically take the form of a control lever either extending from the right hand side of the steering column behind the steering wheel or a floor mounted gearshift lever. Most vehicles now include, as a standard feature, an automatic transmission with a control which allows the selection of different gears as well as the usual park, reverse, neutral and standard automatically shifted drive position. Such controls thus allow the operator to select lower gears if desired for certain uses.

Although the mechanical shifting mechanism provided for controlling either manual or automatic transmissions have proven themselves over years of use, with today's modern vehicles where electronics are becoming more sophisticated and electronic systems for vehicles have reached a level of liability and sophistication which has been unsurpassed in previous vehicle applications; there exists a need for a transmission control system which can be achieved electrically. It is necessary that any such control provides the driver with the confidence of prior mechanical gearshift levers which required an incremental physical movement of a control element to achieve gear changes and one with a physically gripable handle.

Push button electrical control systems for vehicles have not met with great popularity even though they were introduced to the automotive industry as early as in the 1950's with the Edsel vehicle in which mechanical push button switches were located in the steering wheel hub. Other push button control systems have also been suggested as disclosed in U.S. Pat. Nos. 4,922,769 and 4,884,057. U.S. Pat. No. 3,766,793 discloses a rotary mechanical shift dial which is coupled by means of a cable to the vacuum control transmission shifting mechanism. U.S. Pat. No. 3,326,315 discloses a combined transmission shifter and ignition key assembly which can be located on the dashboard or in a console between the vehicle seats. The shifting mechanism includes a mechanical cable connection to the vehicle transmission.

Thus, today, although mechanical and/or electrical push button controls for transmissions have been proposed, they have not gained a foothold in the automotive industry. As vehicles become more sophisticated and ergodynamically designed for operator convenience and safety, the ability to provide a vehicle purchaser with optional or selectable vehicle features is desired. Thus, many vehicle operators would prefer the transmission control located in either a console between the seats or on the steering column. Others may prefer the location of the transmission control at another location such as in the dash area. To provide such selectability with mechanical controls is virtually impossible for the mass produced car market even though the ability to present the customer with such flexibility would be a significant selling feature. Thus, there exists a need for a reliable and acceptable transmission control which electrically controls a transmission and which allows the purchaser to select a convenient location for such control.

SUMMARY OF THE INVENTION

The system of the present invention provides a reliable electrical transmission control with the desired security of providing a single control element which can be firmly grasped by the user to positively select a desired gear. It also provides the flexibility of mounting the gear selector control at any number of desired locations within the interior of the vehicle such that the vehicle purchaser can select the desired location or even change the location if desired. Further, the system of the present invention includes, in its preferred form, a rotary dial type electrical switch which interfaces with an electrical control circuit which safeguards against inadvertent operations such as switching into reverse gear while moving forwardly.

In another embodiment of the invention, a sliding switch can be employed for providing the selected gear information to the transmission control circuit. In yet another embodiment, a lever-type switch module can be substituted for either the rotary or sliding controls. The system of the present invention provides an electrical socket for receiving a plug-in electrical gear select module for selecting a desired gear. The electrical socket can be positioned at one or a plurality of locations within the vehicle to allow the vehicle operator to plug the gear select switch module in any one of the desired sockets.

In one preferred embodiment of the invention, a rotary dial switch is employed as a gear selector control and includes connector means for connecting the switch directly into the receiving socket mounted to the vehicle. In another embodiment, the selector switch is a slide-type switch. In a further embodiment, the control is a lever-type switch with a control handle. In the preferred embodiment, the socket for the selector control is mounted to the vehicle by interconnection means allowing the gear select control switch to be tilted to a desired use position by the vehicle operator. In another embodiment of the invention, the transmission gear select switch can be removed from the vehicle for providing anti-theft security preventing the transmission from being shifted without the switching module.

These and other features, objects and advantages of the present invention will become apparent upon reading the following description thereof together with reference to the accompanying drawings in which:

DETAILED DESCRIPTION OF THE PREFERRED EMBODIMENT

Figure 1:
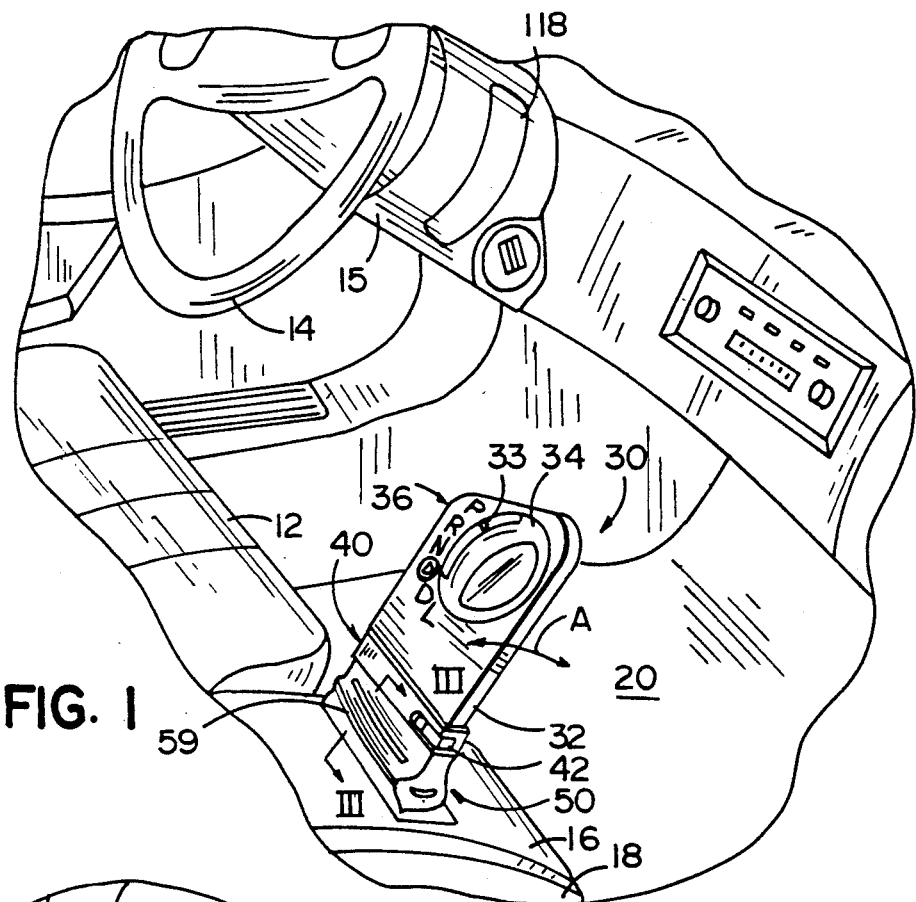
FIG. 1 is a fragmentary perspective view of one embodiment of the present invention.

Referring initially to FIG. 1, there is shown a vehicle 10, such as an automobile, which includes a front passenger compartment having a driver's side seat 12, a steering wheel 14 and a center console 16 mounted between the driver's seat 12 and a passenger seat 18. The center console 16 may be mounted directly to the floor 20 of the vehicle or preferably to the frame of seat 12 such that it moves with the frame as the seat is adjusted. Mounted to the forward edge of console 16 is a gear select control 30 embodying the present invention.

Figure 2:
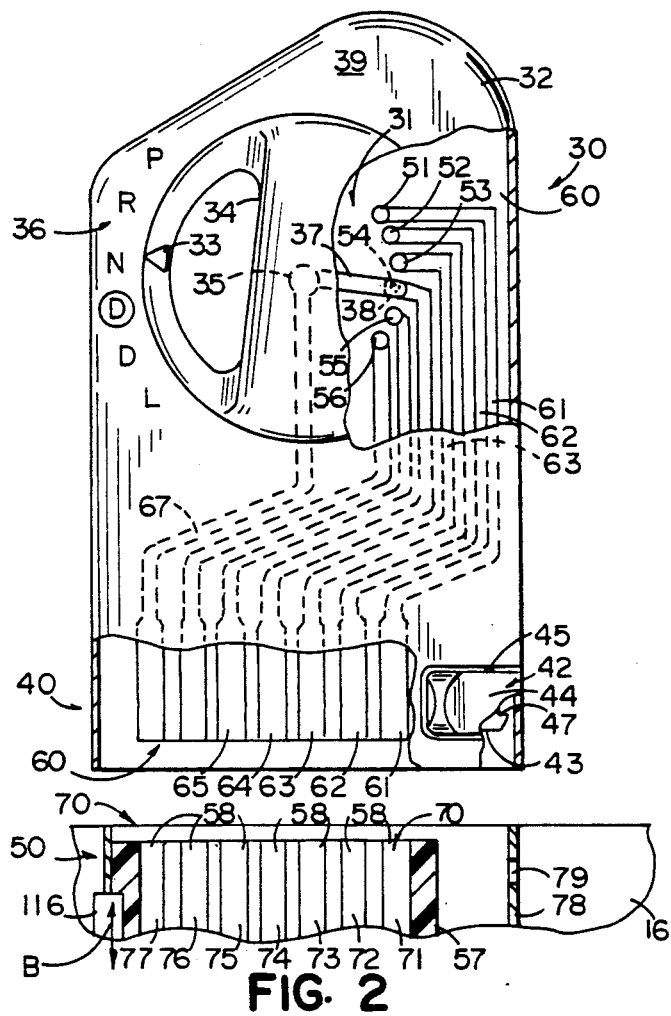
FIG. 2 is a front elevational view partly broken-away and partly in phantom form of the gear select control switch of FIG. 1, showing the connector and locking mechanism associated with the control and the receiving socket.
Figure 8:
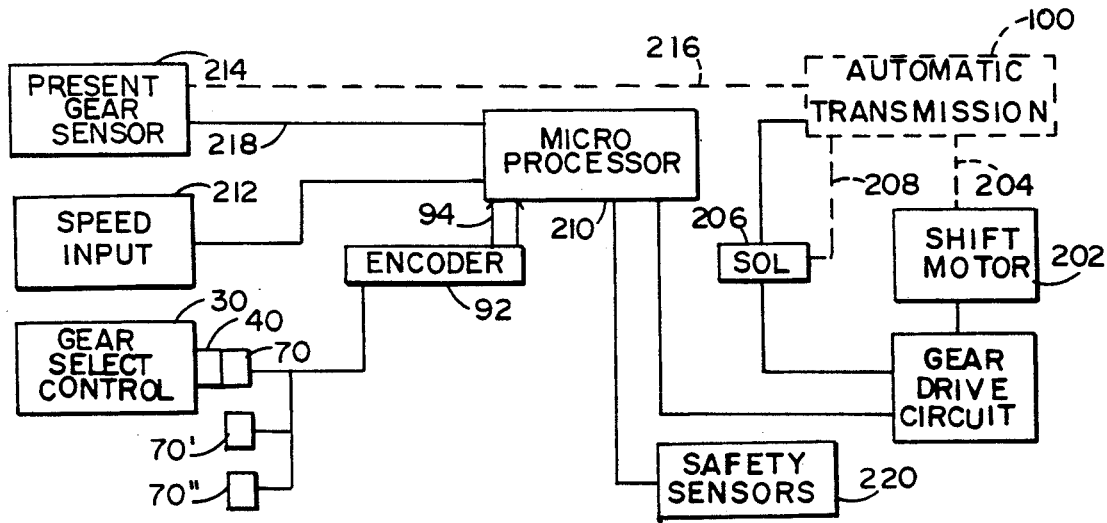
FIG. 8 is an electrical circuit diagram partly in block and schematic form of the system of the present invention.
Figure 3:
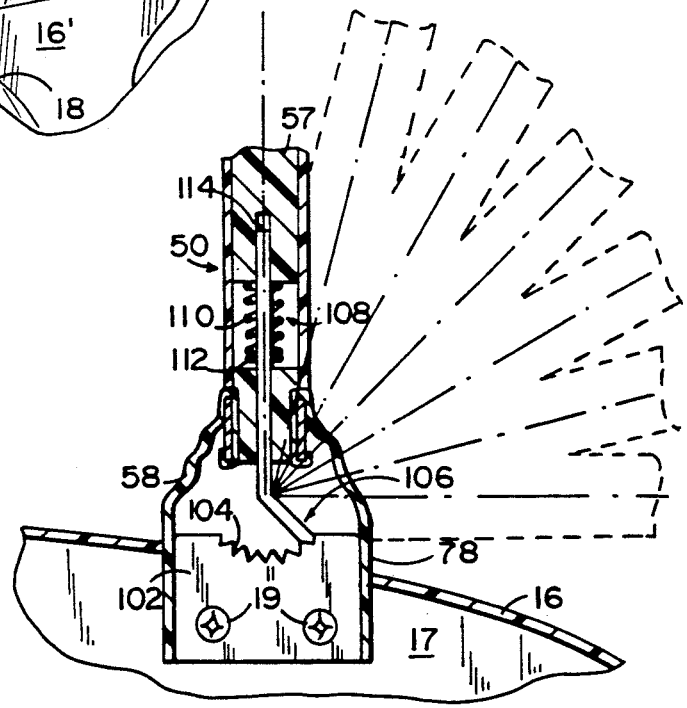
FIG. 3 is an enlarged fragmentary vertical cross-sectional view of a portion of the socket shown in FIG. 2 taken along section line III—III in FIG. 2.

In the embodiment shown in FIGS. 1-3, the gear select control 30 includes a relatively flat housing 32 with a generally rounded upper end. The housing is split into halves prior to assembly and includes therein a rotary-type electrical switch 31 with arcuately spaced fixed contacts, and a moveable contact as described below in conjunction with FIG. 2. Switch 31 includes a control shaft 35 which extends through one side of the housing 32 and terminates in a control knob 34 with a pointer 33 pointing to arcuately spaced indicia 36 constituting the letters PRNODL corresponding to park, reverse, neutral, overdrive, drive and low gears respectively of an automatic transmission 100 (FIG. 8) which is mounted to the vehicle. The housing includes an electrical and mechanical connector plug 40 at an end remote from control knob 34 and locking means 42 for removably coupling the gear select control 30 to a receptor 50 mounted to the front of the console 16 as shown in FIGS. 1 and 3 or other locations as described in greater detail below. Receptor 50 includes an electrical socket 70 (FIG. 2) which is coupled to the electrical control system as shown in FIG. 8, described below. Receptor 50 is covered with a flexible boot 59 to allow adjusted tilting of the select control 30 to a desired position utilizing the mechanism shown in FIG. 3.

The gear select control and mating socket is shown in detail in FIG. 2 with housing 30 enclosing the rotary electrical switch 31. The shaft 35 of switch 31 extends to a conductive wiper arm 37 which sweeps in an arc and includes a dimple contact 38 at its end which selectively engages one of six fixed contacts 51-56 mounted, as is switch 31, to a circuit board 60. Conductors 61-66 are coupled to contacts 51-56 respectively and can be in the form of printed circuit conductive strips on the printed circuit board 60 mounted within housing 30. The end of conductors 61-66 terminate in the center area of the housing which supports the circuit board 60 and define the male plug or connector 40 associated with the gear select control 30. The conductors 61-66 may integrally include the circular contact pads 51-56 respectively. A common or ground return conductor 67 is coupled to wiper arm 37 and selectively to one of the conductors 61-66 for providing a control signal to the electrical circuit shown in FIG. 8 indicating the selected position of the control knob 34 associated with the gear select control.

Thus, for each of the positions PRNODL, a unique one of the conductors 61-66 is coupled by switch 31 to conductor 67 for providing a control signal for the transmission control circuit shown in FIG. 8. The connector plug 40, defined by the edge of circuit board 60, is recessed from the end 43 of housing 30 slightly inwardly as shown in FIG. 2 for protection of the contacts defined by the ends of conductor 61-66. The edge of housing 30 adjacent end 43 includes a pivot latch mechanism 42 having a control member 44 pivotally mounted by a pivot arm 45 to the housing 30 and conventionally spring-loaded to hold the connector in a normal locking position with a locking tab 47 formed on the inner surface of member 44 extending inwardly toward circuit board 60. The housing 32 for switch 31 typically will be made in two halves divided along its longitudinal centerline with a front half 39 seen in FIG. 2 on which the indicia 36 is printed. The halves can be snap-fit or bonded together and the side walls will include an interior slot for lockably receiving the circuit board 60 carrying conductors 61-67. The housing 32 can be made of any suitable polymeric material such as polycarbonate or the like which provides structural rigidity to the assembly. The switch contacts 51-56 and wiper arm 37 may include discreet gold plated contacts which are coupled to conductors 61-67 to provide greater reliability to the transmission shift control.

Figure 7:
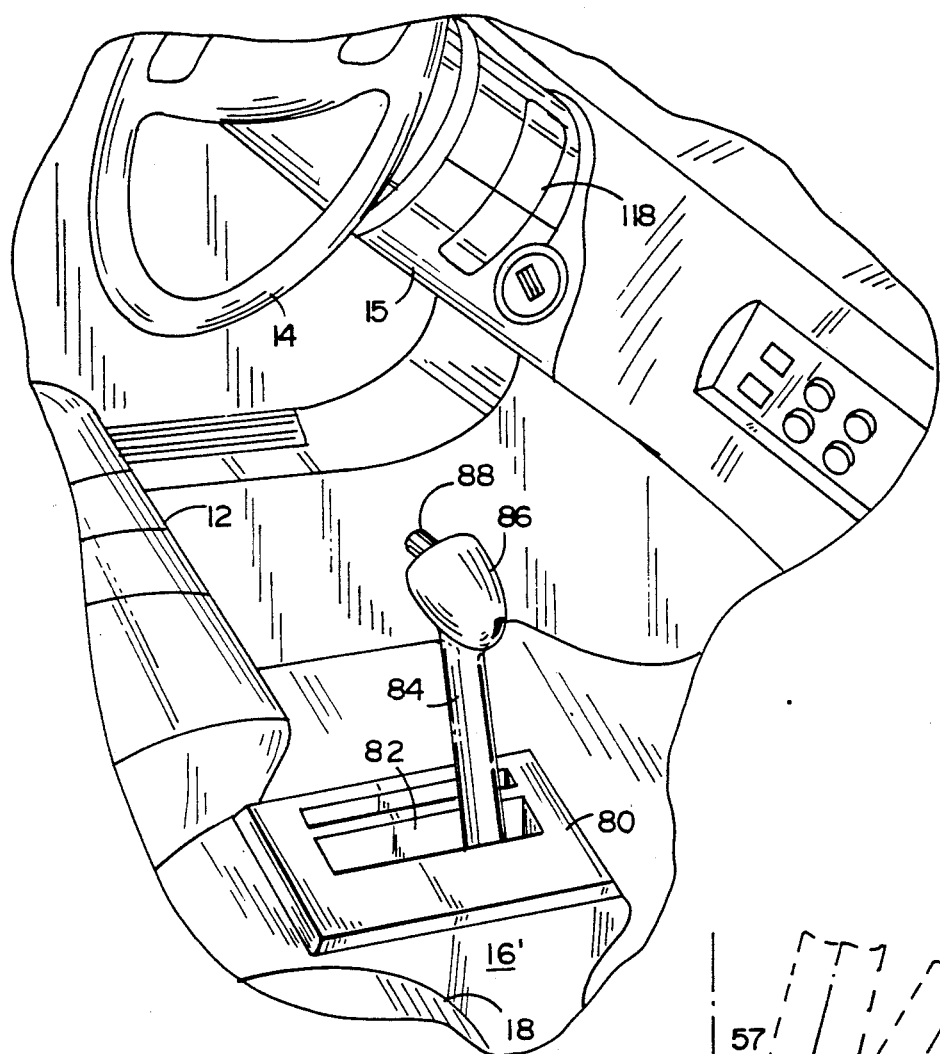
FIG. 7 is a fragmentary perspective view of still a further of the present invention.

The socket 70 within the mechanical receptor 50 includes a housing 57 with a plurality of slots 58 for receiving plug 60. Conductors 71-77 are mounted within housing 57 and in slots 58 to engage the corresponding conductors 61-67 of the plug. Conductors 71-77 are flexible for allowing receptor 50 to be pivoted to a desired forward or rearward position as illustrated by arrow A in FIG. utilizing the mechanism shown in FIG. 3 while coupling the socket 70 to the control circuit as shown in FIG. 7. The receptor 50 includes a side wall 78 with an aperture 79 for receiving locking tab 47 when plug 40 is coupled to receptor 50.

Receptor 50 with circuit board receiving socket 70 is mounted to a console 16 as seen in FIG. 3 by mounting the lower edge of sidewall 78 to a side 17 of console 16 using screws 19. A ratchet plate 102 with upwardly extending teeth 104 is also secured to the left side of housing 78 of receptor 50 for selectively holding a spring loaded locking pin 106 in a fixed position with respect to the console. Pin 106 is slideably mounted to housing 57 which includes a recess 108 for a compressing spring 110 engaging a collar 112 fixed to pin 106 for urging the pin into engagement with teeth 104. Pin 106 extends within a slot 114 in housing 57 and is bent at a 90 degree angle to couple to a side mounted slide control tab 116 (FIG. 2) for actuating the pin. Thus, movement of the tab upwardly along the path indicated by arrow B in FIG. 2. will disengage pin 106 from teeth 104 and allow the gear select control 30 coupled to the receptor 50 to be moved to a desired tilted position as shown in phantom lines in FIG. 3. Boot 59 provides a trim appearance to the installation as viewed in FIG. 1 while allowing such motion. Before describing the electrical control system provided by the gear select control shown in FIGS. 1-3, a description of alternate installations and switch configurations is shown in connection with FIGS. 4-7.

Figure 4:
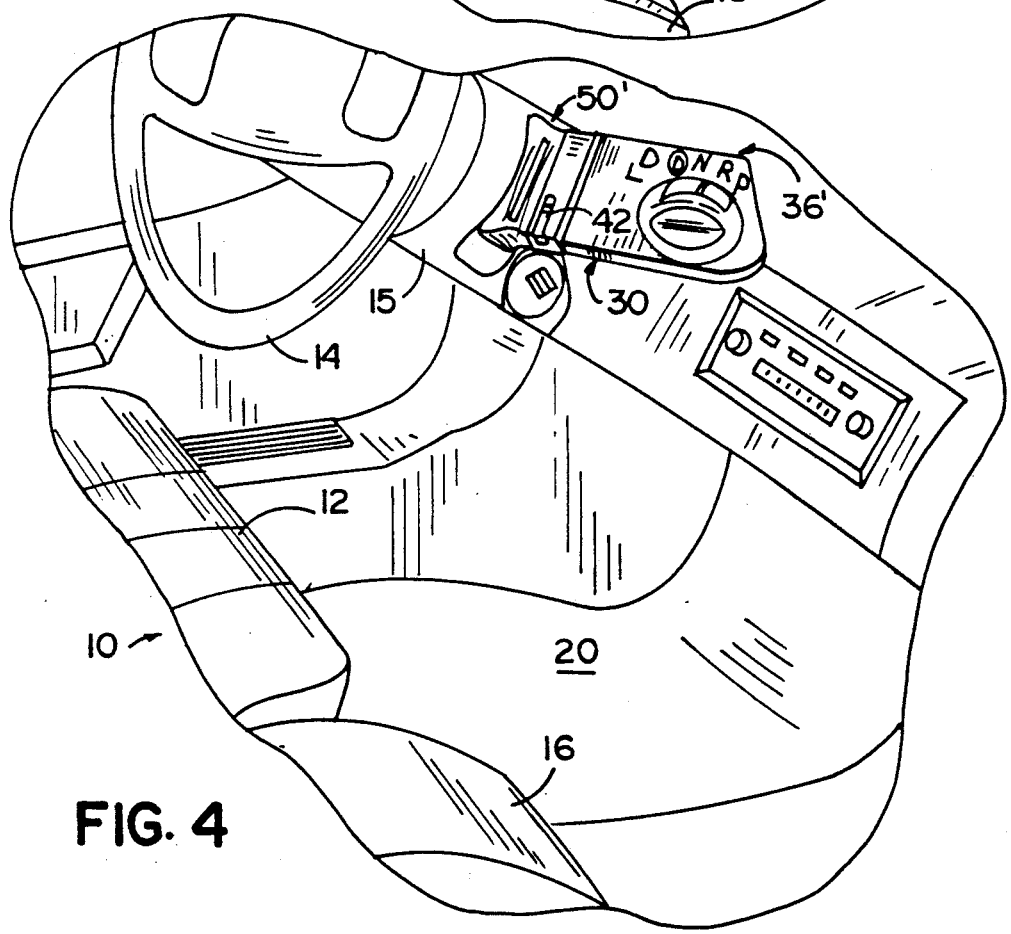
FIG. 4 is a fragmentary perspective view of another embodiment of the present invention.

It should be understood that receptor 50, which is mounted to console 16, is but one of several possible locations and as seen in FIG. 1 the steering column 15 associated with the steering wheel 14 may include a receptor 50' which, as seen in FIG. 1, is covered by a protective cover 118 since it is not in use. As seen in FIG. 4, a select control 30, of substantially identical construction to that shown in FIG. 1, is employed and is mounted in the receptor 50' associated with steering column 15. In this case, the construction of the gear selector switch of FIG. 3 is identical to that of FIG. 1 with the exception of the indicia 36' which is printed on a different plane to allow horizontal reading of the letters corresponding to the various selected gears.

Figure 5:
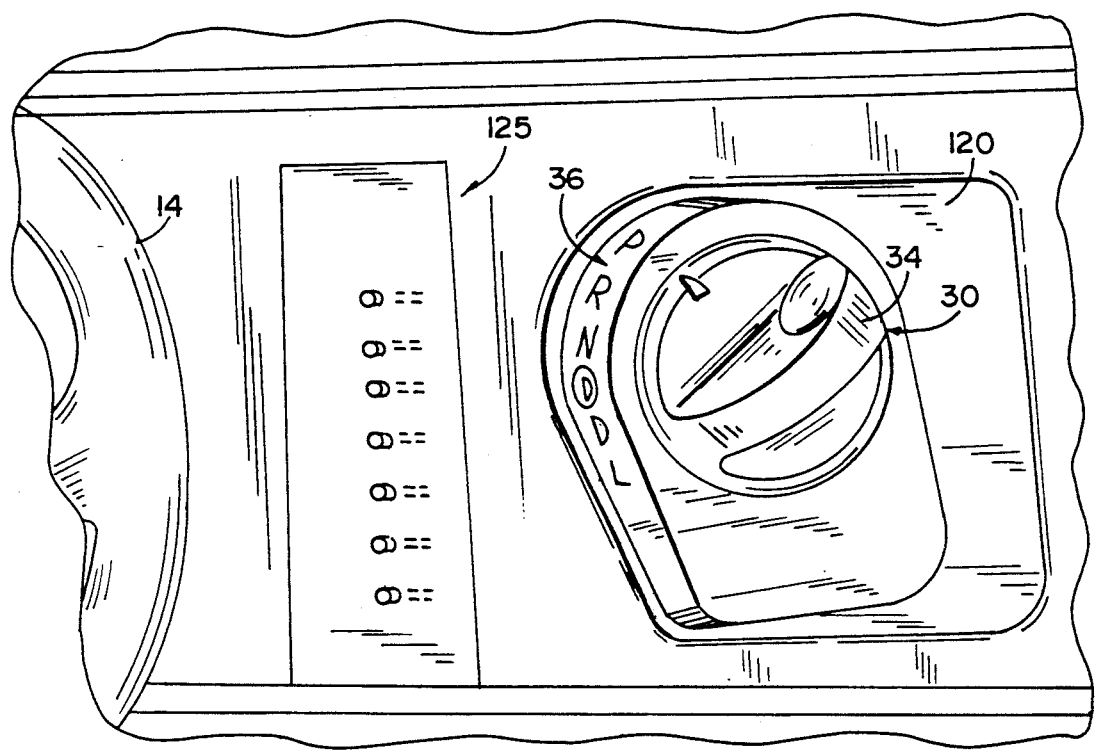
FIG. 5 is a fragmentary perspective view of a third embodiment of the present invention.

FIG. 5 illustrates the dashboard mounting of a rotary control switch 30' which can be substantially identical to switch 30 in terms of its contact arrangement and wiper contact. Switch 30', however, is mounted directly into the dashboard 125 of the vehicle by means of a mounting panel 120 and therefore the conductors 61-67 of the switch 30, shown in FIG. 2 and the housing shape 30 are somewhat different. The contacts 51-56 and wiper arm 37 are the same as is control knob 34 and the indicia 36 to indicate the selected gear position. Behind panel 120 is a suitable socket 70 which mates with the conductors associated with switch 30'. Panel 120 will include a cover plate (not shown) when switch 30' is not employed in favor of switch 30 in an arrangement shown in FIGS. 1 or 4.

Figure 6:
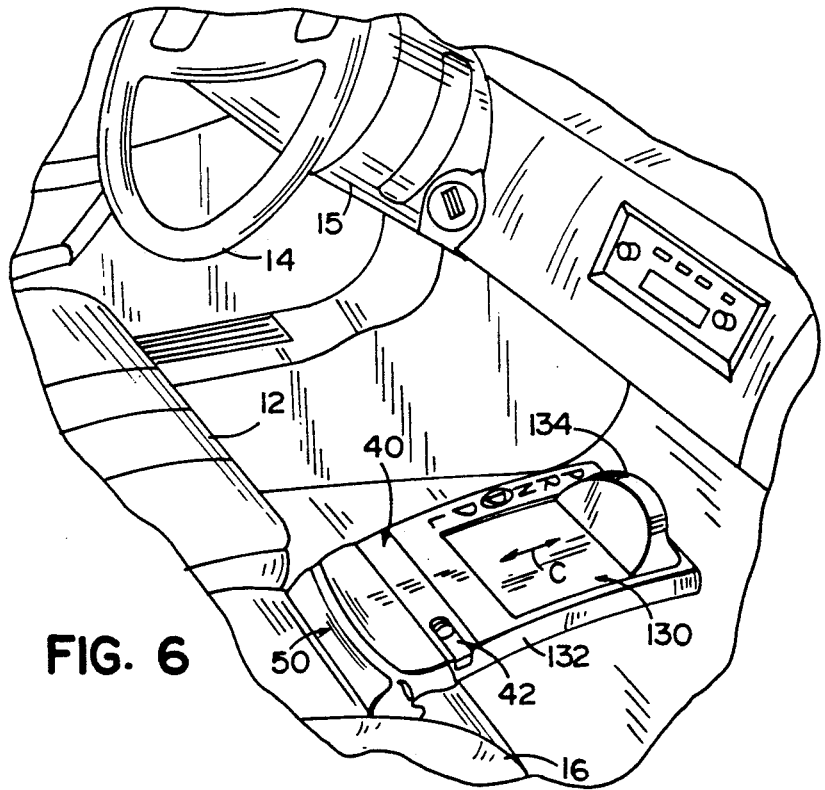
FIG. 6 is a fragmentary perspective view of yet another embodiment of the present invention.

FIG. 6 shows yet another embodiment of the invention in which a sliding switch 130 is employed and is mounted in a housing 132 and can have substantially the same construction as housing 32 except that the contacts of the electrical switch incorporated therein are in the form of a slide switch controlled by a control handle 134 which slides in a direction indicated by arrow C in FIG. 5 between the park position at one extreme and the low gear position at the opposite extreme. As with switch 31 shown in FIG. 2, switch 130 includes contacts for each of the gear positions and includes an associated conductor, such as conductors 61-67, with a conductor 67 coupled to the control knob 134 for commonly coupling one of the selected gear contacts with the center conductor associated with movable knob 134. Gear select control 130 also includes a locking member 42 which is mounted to plug 40 which in turn is mounted to receptor 50 within console 16 in the same manner as that shown in FIG. 1.

Another gear selector control is illustrated in FIG. 7 in which the rotary electrical switch 30 of FIG. 2 is mounted within a console 16' below a top cover plate 80 having a slot 82 formed therein for an extension arm 84 for the control knob 34 which is mounted vertically within housing 16'. This arrangement provides the appearance a feel of a conventional stick-type gearshift. The end of extension arm 84 terminates in a shift knob 86 of conventional design with a push button locking mechanism 88 for locking the shift arm control 84 in the park position as is conventional. Thus, with the embodiment shown in FIG. 7, the electrical rotary switch mechanism shown in FIG. 2, is employed and coupled to arm 84 to provide a conventional appearing and feeling control and yet use the switch arrangement of the preferred embodiment. The electrical operation of each of the various switches and their positioning in the vehicle, which may include three receptors 50 at different locations and each with a socket 70 for receiving the control switch 30 or at the manufacturer's option to include but one desired location, is now described in connection with FIG. 8.

Referring now to FIG. 8, there is shown an electrical circuit 200 which is shown in schematic and block form. FIG. 8 also shows the mechanical interconnection of the control circuit for the gear select control 30 with the vehicles automatic transmission 100. The electrical control circuit and system 200 can be substantially the same as that the disclosed in U.S. Pat. No. 4,922,769, issued on May 8, 1990, the disclosure of which is incorporated herein by reference. Briefly, however, the control circuit 200 includes a reversible DC motor 202 with a output shaft 204 coupled to the automatic transmission shift control shaft. Circuit 200 also includes a solenoid 206 coupled by mechanical coupling shaft 208 to the kick-down arm of the automatic transmission for changing to a lower gear upon demand. Signals for controlling the solenoid and motor are provided by a microprocessor 210 which receives input control signals from the gear select control circuit 30 through its coupling by plug 40 and one of three sockets 70, 70' or 70". Each of these sockets are coupled in parallel with one another and to a switch encoder circuit 92 by a conductor parallel wire harness 90. Thus, regardless of the type of gear select switch shown in FIGS. 1-7, each switch for each mounting location will provide continuity between the center wiper arm 37 of switch 31 of the gear select control and one of the contacts associated with each of the individual gear select positions. The encoder circuit 92 which provides binary 0 or 1 signals in a readable format to microprocessor 200 via bus 94. Microprocessor 210 also receives speed input signals in a suitable digital format for processing from a speed input sensor and signal circuit 212. Information as to the present gear in which the transmission is functioning is detected by a present gear sensor 214 which is mechanically coupled to the automatic transmission through a suitable mechanical coupling 216 and provides signals representing the present gear to microprocessor 210 via conductors 218. Also, the microprocessor receives input signals from a variety of safety sensors 220 as described in the above identified patent which includes, for example, sensors that make certain that the automatic transmission can not be put in gear without a driver being detected in the driver seat.

The various safety sensors are described in the above identified patent in greater detail as is the programming and operation of the microprocessor. Briefly however, the microprocessor is programmed to receive the desired gear select information from any one of the three or more different locations on the vehicle through the use of sockets 70, 70' and 70" to control the transmission in response to the operator's selected gear. The microprocessor is programmed to include safeguards such as preventing the shifting of the transmission into reverse while the speed input signal indicates the car is moving forwardly. The microprocessor also includes a software subroutine which detects the presence of the gear select control 30 and its electrical interconnection with one of the sockets 70, 70' and 70" to assure that the shift control is installed before the transmission can be moved from the park position which is the at rest position in the event that the gear select control is removed. Thus, the vehicle operator can, by depressing the spring loaded latch mechanism 42, remove the gear select control 30 and the car will not be moveable since the transmission can not be controlled. This provides an additional anti-theft feature to the system which also allows the flexibility of providing the rotary or sliding knob control at one of three or more possible locations within the vehicle.

The control of the present invention therefore provides the vehicle operator and the manufacturer with the flexibility of locating the electrical gear shift where desired or even changing such location if desired. It also provides the consumer with a reliable electrically controlled shift mechanism with the added anti-theft feature. It will become apparent to those skilled in the art that various modifications to the preferred embodiment of the invention can be made without departing from the spirit or the scope thereof as defined by the appended claims.

The embodiments of the invention in which an exclusive property or privilege is claimed are defined as follows:

1. A gear select control system for a vehicle transmission comprising:

an electrical control circuit for providing transmission control signals for shifting the transmission to different gear positions;

a plurality of separate electrical socket means mounted at different spaced locations within a vehicle, each of said socket means having identically constructed receptors electrically connected to a first electrical conductor means for completing an electrical connection to said electrical control circuit;

means for coupling said electrical control circuit to at least one of said first electrical conductor means of one of said sockets;

a gear select control unit having an electrical plug means receivable in any one of said receptors, said electrical plug means having second conductor means electrically connected to said first electrical conductor means of said one of said electrical sockets receiving said plug to thereby electrically connect said second conductor means of said gear select control unit to said electrical control circuit;

means coupled to said electrical control circuit for receiving said transmission control signals and coupled to the transmission for shifting the transmission in response to said transmission control signals; and said gear select control unit having switch means electrically connected to said second electrical conductor means and movable between a plurality of different positions corresponding to different gears of the transmission of the vehicle for providing gear select signals to said control circuit which responds thereto for providing said transmission control signals.

2. The apparatus as defined in claim 1 wherein said switch means comprises a rotary dial switch having a wiper arm and a plurality of fixed contacts wherein each of said contacts correspond to a gear position of the transmission.

3. The apparatus as defined in claim 1 wherein said rotary switch includes an elongated knob for easy grasping by the user.

4. The apparatus as defined in claim 1 wherein said switch means comprises a slide switch.

5. The apparatus as defined in claim 1 wherein at least one of said sockets is positioned in a center console located adjacent the driver's seat of the vehicle.

6. The apparatus as defined in claim 5 wherein at least another of said sockets is located in the steering column of the vehicle.

7. The apparatus as defined in claim 6 wherein still a further one of said sockets is located in the dashboard of the vehicle.

8. A gear select control system for a vehicle transmission comprising:

a plurality of separate electrical sockets mounted at different spaced locations within a vehicle, each socket being identically constructed for receiving a plug-in gear select control switch unit;

a gear select control switch unit having an electrical plug means constructed to be received in any one of said plurality of said electrical sockets;

an electrical control circuit coupled to at least one of said sockets and to a transmission control member for shifting the transmission in response to transmission control signals therefrom;

said gear select control switch unit having switch means movable between a plurality of different positions corresponding to different gears of the transmission of the vehicle for providing gear select signals to said control circuit which responds thereto for providing said transmission control signals.

9. The apparatus as defined in claim 8 wherein said switch means comprises a rotary dial switch having a wiper arm and a plurality of fixed contacts wherein each of said contacts correspond to a gear position of the transmission.

10. The apparatus as defined in claim 8 wherein said switch means comprises a slide switch.

11. The apparatus as defined in claim 8 wherein at least one of said sockets is positioned in a center console located adjacent the driver's seat of the vehicle.

12. The apparatus as defined in claim 11 wherein at least another of said sockets is located in the steering column of the vehicle.

13. The apparatus as defined in claim 12 wherein still further one of said sockets is located in the dashboard of the vehicle.

14. The apparatus as defined in claim 8 wherein said control circuit includes a microprocessor and said microprocessor is programmed to detect whether or not a gear select switch is plugged into one of said sockets and if not transmission control signals are not generated thereby providing anti-theft protection for the vehicle.

15. The apparatus as defined in claim 8 wherein said plug means includes means for lockably holding said plug means to said sockets.

16. The apparatus as defined in claim 15 and further including a receptor for at least one of said sockets and wherein said receptor includes means co-operating with said holding means of said plug means for holding said plug-in engagement with said socket.

17. A gear select control system for a vehicle transmission comprising:

a plurality of separate identically constructed receptors located in different spaced locations of a vehicle, each of said receptors including an electrical socket for receiving a plug-in transmission control switch unit;

a transmission control switch unit having an electrical plug means receivable in any one of said sockets of said plurality of receptors;

an electrical control circuit coupled to at least one of said sockets and to a transmission control member for shifting the transmission in response to transmission control signals therefrom; and said transmission control switch unit being constructed of a housing including a gear select control switch having a movable contact and fixed contacts, wherein said movable contacts moves between a plurality of different positions corresponding to different gears of the transmission of the vehicle for providing gear select signals to said control circuit which responds thereto for providing said transmission control signals and plug means coupled to said switch for coupling said switch into said electrical socket of any one of said receptors.

18. The apparatus as defined in claim 17 wherein said housing and receptor includes locking means which cooperate to lockably hold said switch means in said socket.

19. The apparatus as defined in claim 18 wherein said switch means comprises a rotary dial switch having a wiper arm and a plurality of fixed contacts wherein each of said contacts correspond to a gear position of the transmission.

20. The apparatus as defined in claim 18 wherein said switch means comprises a slide switch.

21. The apparatus as defined in claim 20 wherein at least one of said receptors is positioned in a center console located adjacent the driver's seat of the vehicle.

22. The apparatus as defined in claim 21 wherein at least another of said receptors is located in the steering column of the vehicle.

23. The apparatus as defined in claim 22 wherein still a further one of said receptors is located in the dashboard of the vehicle.

24. The apparatus as defined in claim 17 wherein said control circuit includes a microprocessor and said microprocessor is programmed to detect whether or not a gear select switch is plugged into said socket and if not transmission control signals are not generated thereby providing anti-theft protection for the vehicle.

* * * * *